(12) United States Patent
Hama

(10) Patent No.: US 12,269,010 B2
(45) Date of Patent: Apr. 8, 2025

(54) WATER-ABSORBING RESIN AND WATER-BLOCKING MATERIAL

(71) Applicant: SUMITOMO SEIKA CHEMICALS CO., LTD., Hyogo (JP)

(72) Inventor: Maoki Hama, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 363 days.

(21) Appl. No.: 17/599,071

(22) PCT Filed: Mar. 27, 2020

(86) PCT No.: PCT/JP2020/013899
§ 371 (c)(1),
(2) Date: Sep. 28, 2021

(87) PCT Pub. No.: WO2020/203722
PCT Pub. Date: Oct. 8, 2020

(65) Prior Publication Data
US 2022/0176347 A1 Jun. 9, 2022

(30) Foreign Application Priority Data
Mar. 29, 2019 (JP) .................................. 2019-069053

(51) Int. Cl.
*B01J 20/26* (2006.01)
*B01J 20/28* (2006.01)

(52) U.S. Cl.
CPC ....... *B01J 20/267* (2013.01); *B01J 20/28016* (2013.01); *B01J 2220/44* (2013.01)

(58) Field of Classification Search
None
See application file for complete search history.

(56) References Cited

U.S. PATENT DOCUMENTS

| | | | |
|---|---|---|---|
| 4,812,486 A | 3/1989 | Hosokawa et al. | |
| 2005/0085604 A1 * | 4/2005 | Handa | C08F 6/006 526/317.1 |
| 2009/0118432 A1 * | 5/2009 | Fukudome | C08K 5/175 525/329.9 |
| 2016/0367717 A1 | 12/2016 | Hinayama et al. | |

FOREIGN PATENT DOCUMENTS

| | | |
|---|---|---|
| CN | 105408365 A | 3/2016 |
| CN | 107502325 A * | 12/2017 |
| EP | 0 323 243 A2 | 7/1989 |
| EP | 2 505 594 A1 | 10/2012 |
| EP | 2 740 747 A1 | 6/2014 |
| JP | H1-210463 A | 8/1989 |
| JP | H2-064163 A | 3/1990 |
| JP | H2-135263 A | 5/1990 |
| JP | H2-292341 A | 12/1990 |
| JP | H3-014809 A | 1/1991 |
| JP | H8-067821 A | 3/1996 |
| JP | 2000-7790 A | 1/2000 |
| JP | 2003-206305 A | 7/2003 |
| JP | 2014-147281 A | 8/2014 |
| WO | 2005/097313 A1 | 10/2005 |
| WO | 2006/094907 A1 | 9/2006 |
| WO | 2007/004529 A1 | 1/2007 |
| WO | 2007/037453 A1 | 4/2007 |

OTHER PUBLICATIONS

Myriam Gourmand et al., "Superabsorbent Polymers for Cable Application", Nonwovens World, Oct.-Nov. 2000, pp. 73-83.
"Super Absorbent Polymer Aqua Keep", Sumitomo Seika Chemicals Co., Ltd., 2014, 8 pgs.
A Third Party Observation filed against corresponding International Application No. PCT/JP2020/013899 dated Jul. 28, 2021.
Fredric L. Buchholz et al., editors, "Modern Superabsorbent Polymer Technology", pp. 73, 97-103, and 264-265 (1997)(12 pgs.).
Another Third Party Observation filed against corresponding International Application No. PCT/JP2020/013899 dated Jul. 28, 2021.
International Search Report for PCT/JP2020/013899 dated Jun. 9, 2020 (PCT/ISA/210).

* cited by examiner

*Primary Examiner* — Joseph D Anthony
(74) *Attorney, Agent, or Firm* — Sughrue Mion, PLLC

(57) ABSTRACT

Provided are: a water-absorbent resin that has excellent heat resistance, even in a water-absorbed state; and a water-blocking material comprising the water-absorbent resin. The water-absorbent resin according to the present invention includes a crosslinked polymer of a water-soluble ethylenically unsaturated monomer, and has a gel-viscosity retention S of 0.5 or more as calculated by the following formula (I):

$$\text{Gel viscosity retention at high temperature } S = B/A \quad \text{(I)}$$

(wherein A represents an initial gel viscosity (mPa·s), and B represents a gel viscosity (mPa·s) after 10 days).

3 Claims, No Drawings

WATER-ABSORBING RESIN AND WATER-BLOCKING MATERIAL

CROSS REFERENCE TO RELATED APPLICATIONS

This application is a National Stage of International Application No. PCT/JP2020/013899 filed Mar. 27, 2020, claiming priority based on Japanese Patent Application No. 2019-069053 filed Mar. 29, 2019.

TECHNICAL FIELD

The present invention relates to a water-absorbent resin and a water-blocking material.

BACKGROUND ART

Water-absorbent resins have an excellent water absorption ability, and can exert a water-blocking effect. Therefore, water-absorbent resins are known to find various applications in which water-blocking properties are required. For example, water-absorbent resins are used as water-blocking materials for communication cables and power cables, such as optical cables and metal cables.

Patent Literature (PTL) 1 discloses a technique of a water-blocking material wherein a water-absorbent sheet including a water-absorbent resin is enclosed in an external material to prevent a gel of the water-absorbent resin swollen by water absorption from seeping out.

CITATION LIST

Patent Literature

PTL 1: JP2014-147281A

SUMMARY OF INVENTION

Technical Problem

However, water-blocking materials using conventional water-absorbent resins do not have sufficient heat resistance. Therefore, there is a problem that when a water-blocking material has absorbed water (i.e., is in a gel state) and the temperature of the water-blocking material rises due to electric heating or the like, the water-absorbent resin that constitutes the water-blocking material tends to decompose, which significantly decreases water-blocking effects. In particular, cables such as communication cables and power cables are installed in all environments around the world. Therefore, if the heat resistance of the water-blocking material is low, the location where cables can be installed is naturally limited to areas with mild temperatures. It is also known that when power cables are used, the conductor heats up to about 90° C. From these viewpoints, the development of a water-absorbent resin that can be used as a water-absorbent material for cables subjected to high-temperature environments has been strongly desired.

The present invention was made in view of the above. An object of the present invention is to provide a water-absorbent resin that has excellent heat resistance, even in a water-absorbed state; and a water-blocking material including the water-absorbent resin.

Solution to Problem

As a result of diligent research to achieve the above object, the present inventors found that the above object can be achieved by adjusting to a specific range the gel viscosity retention obtained by a predetermined calculation formula. The present inventors thereby accomplished the present invention.

Specifically, the present invention includes, for example, the subjects described in the following items.

Item 1

A water-absorbent resin including a crosslinked polymer of a water-soluble ethylenically unsaturated monomer, the water-absorbent resin having a gel viscosity retention S of 0.5 or more as calculated by the following formula (I):

$$\text{Gel viscosity retention at high temperature } S = B/A \quad (\text{I})$$

wherein A represents an initial gel viscosity (mPa·s); and B represents a gel viscosity (mPa·s) after 10 days.

Item 2

The water-absorbent resin according to Item 1, wherein the polymer is crosslinked with a post-crosslinking agent.

Item 3

A water-blocking material including the water-absorbent resin of Item 1 or 2.

Advantageous Effects of Invention

The water-absorbent resin of the present invention has excellent heat resistance, even after water absorption.

The water-blocking material of the present invention has excellent heat resistance, even after water absorption since it contains the water-absorbent resin as a component.

DESCRIPTION OF EMBODIMENTS

Embodiments of the present invention are described in detail below. In the numerical ranges described in stages in the present specification, the upper or lower limit of the numerical range in one stage can be arbitrarily combined with the upper or lower limit of the numerical range in another stage. In the numerical range described herein, the upper or lower limit of the numerical range may be replaced by the value shown in the Examples, or with a value that can be unambiguously derived from the Examples. In the present specification, numerical values connected by "to" mean a numerical range including the numerical values before and after "to" as the lower and upper limits.

1. Water-Absorbent Resin

The water-absorbent resin of the present invention has a structure in which a polymer of a water-soluble ethylenically unsaturated monomer is crosslinked, and has a gel viscosity retention of 0.5 or more as calculated by the following formula (I):

$$\text{Gel viscosity retention at high temperature } S = B/A \quad (\text{I})$$

In formula (I), A represents an initial gel viscosity (mPa·s); and B represents a gel viscosity (mPa·s) after 10 days. In particular, A represents a gel viscosity of the water-absorbent resin in the state in which the resin is swollen 1000-fold with water; and B represents a gel viscosity of the water-absorbent resin 10 days after the 1000-fold-swollen water-absorbent resin has been subjected to a heat treatment under predetermined conditions. In the present invention, the gel viscosity retention S of the water-absorbent resin is measured in accordance with the method described below in section "Method for Measuring Gel Viscosity Retention" in the Examples.

In formula (I), "at a high temperature" means under an environment where the temperature is 90±2° C.

The water-absorbent resin of the present invention has a gel viscosity retention S of 0.5 or more; that is, the lower limit of the gel viscosity retention S is 0.5. Based on this gel viscosity retention, the water-absorbent resin has excellent heat resistance, even after water absorption. More specifically, even if the water-absorbent resin in a water-absorbed state is placed in a high-temperature environment, decomposition, deterioration, etc. of the water-absorbent resin are less likely to occur; therefore, the water-absorbent resin can more easily maintain the water-absorbed state, even if the resin is placed in a high-temperature environment.

The water-absorbent resin of the present invention preferably has a gel viscosity retention S of 0.52 or more, more preferably 0.55 or more, and particularly preferably 0.60 or more. In the water-absorbent resin of the present invention, the upper limit of the gel viscosity retention S is not particularly limited. For example, the gel viscosity retention S can be 1.5 or less, and preferably 1.3 or less.

The initial gel viscosity, that is, value A in formula (I), of the water-absorbent resin of the present invention is not particularly limited. For example, from the viewpoint that the water-absorbent resin is less likely to decompose even after water absorption, and tends to have excellent heat resistance, the initial gel viscosity of the water-absorbent resin can be 4000 mPa·s or more, and more preferably 4500 mPa·s or more. The upper limit of the initial gel viscosity of the water-absorbent resin is not particularly limited. For example, the initial gel viscosity A of the water-absorbent resin can be 20000 mPa·s or less, preferably 15000 mPa·s or less, more preferably 13000 mPa·s or less, and even more preferably 9000 mPa·s or less.

The water-absorbent resin of the present invention has a structure in which a polymer of a water-soluble ethylenically unsaturated monomer (hereinafter sometimes simply referred to as the polymer) is crosslinked. The polymer may, for example, have a structure in which the polymer is crosslinked with an internal-crosslinking agent described below; or can be crosslinked with a post-crosslinking agent described below in place of the internal crosslinking agent, or in addition to the internal-crosslinking agent. Since the polymer has a structure in which the polymer is crosslinked with a post-crosslinking agent, the water-absorbent resin has a high crosslinking density near the surface thereof. Crosslinking the polymer with a post-crosslinking agent A makes it easier to achieve a gel viscosity retention S of 0.5 or higher.

If the water-absorbent resin of the present invention has a crosslinked structure inside of the polymer, this internal crosslinked structure is formed when a water-soluble ethylenically unsaturated monomer is polymerized. The crosslinking density of this crosslinked structure can be adjusted according to the amount of the crosslinking agent used when the water-soluble unsaturated monomer is polymerized, wherein the crosslinking agent may be the same as or different from the post-crosslinking agent described above. In the present specification, the crosslinking agent for use in crosslinking the inside of the polymer is referred to as an "internal-crosslinking agent," in order to distinguish it from the post-crosslinking agent. Examples of usable internal-crosslinking agents are described later in detail in section "2. Method for Producing Water-Absorbent Resin."

The water-soluble ethylenically unsaturated monomer for use is, for example, selected from a wide range of known monomers usable in typical water-absorbent resins.

Examples of the water-soluble ethylenically unsaturated monomer include (meth)acrylic acid (in the present specification, "acrylic" and "methacrylic" are together referred to as "(meth)acrylic"; the same applies below) and salts thereof; 2-(meth)acrylamide-2-methylpropanesulfonic acid and salts thereof; nonionic monomers, such as (meth)acrylamide, N,N-dimethyl (meth)acrylamide, 2-hydroxyethyl (meth)acrylate, N-methylol (meth)acrylamide, and polyethylene glycol mono(meth)acrylate; and amino group-containing unsaturated monomers, such as N,N-diethylaminoethyl (meth)acrylate, N,N-diethylaminopropyl (meth)acrylate, and diethylaminopropyl (meth)acrylamide, and quaternized products thereof. These water-soluble ethylenically unsaturated monomers may be used singly, or (copolymerized) in a combination of two or more. In particular, from the standpoint of convenience in industrial availability, (meth) acrylic acid and salts thereof, (meth)acrylamide, and N,N-dimethyl acrylamide are preferable; and (meth)acrylic acid and salts thereof are more preferable.

When acrylic acid or a salt thereof is used as such a water-soluble ethylenically unsaturated monomer, the acrylic acid or a salt thereof is used as the main water-soluble ethylenically unsaturated monomer, and the amount of the acrylic acid or a salt thereof is preferably 70 to 100 mol %, based on the total number of moles of the water-soluble ethylenically unsaturated monomers used.

When the water-soluble ethylenically unsaturated monomer described above is subjected to the reversed-phase suspension polymerization described below, the monomer may be used in the form of an aqueous solution, in order to increase the dispersion efficiency in a hydrocarbon dispersion medium. The concentration of the monomer in such an aqueous solution can be any concentration; however, it is typically 20 mass % or more and the saturated concentration or less, preferably 25 to 90 mass %, and more preferably 30 to 85 mass %.

When the water-soluble ethylenically unsaturated monomer has an acid group, like (meth)acrylic acid or 2-(meth) acrylamide-2-methylpropanesulfonic acid, the acid group of the water-soluble ethylenically unsaturated monomer for use may be neutralized with an alkaline neutralizer beforehand, as necessary. Examples of such alkaline neutralizers include alkali metal salts, such as sodium hydroxide, sodium carbonate, sodium hydrogen carbonate, potassium hydroxide, and potassium carbonate; ammonia; and the like. In particular, these alkaline neutralizers may be used in the form of an aqueous solution in order to simplify the neutralization operation. These alkaline neutralizers may be used singly, or in a combination of two or more.

The degree of neutralization of the water-soluble ethylenically unsaturated monomer with an alkaline neutralizer can be any degree. In order to increase the water-absorption capacity by increasing the osmotic pressure of the water-absorbent resin and to avoid safety problems that may arise due to the presence of an excess of alkaline neutralizer, the degree of neutralization is typically preferably 10 to 100 mol %, and more preferably 30 to 80 mol %, of all acid groups in the water-soluble ethylenically unsaturated monomer.

The type of post-crosslinking agent can be selected, for example, from a wide range of known post-crosslinking agents usable in water-absorbent resins. The post-crosslinking agent for use can be a compound having two or more reactive functional groups.

Specific examples of the post-crosslinking agent include polyols, such as ethylene glycol, propylene glycol, 1,4-butanediol, trimethylolpropane, glycerol, polyoxyethylene glycol, polyoxypropylene glycol, and polyglycerol; polyglycidyl compounds, such as (poly)ethylene glycol diglycidyl ether, (poly)glycerol diglycidyl ether, (poly)glycerol triglycidyl ether, trimethylolpropane triglycidyl ether, (poly)propylene glycol polyglycidyl ether, and (poly)glycerol polyglycidyl ether; haloepoxy compounds, such as epichlorohydrin, epibromohydrin, and α-methyl epichlorohydrin; isocyanate compounds, such as 2,4-tolylene diisocyanate and hexamethylene diisocyanate; oxetane compounds, such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; oxazoline compounds, such as 1,2-ethylene bis oxazoline; carbonate compounds, such as ethylene carbonate; and hydroxy alkyl amide compounds, such as bis[N,N-di(β-hydroxyethyl)]adipamide. Of these, polyglycidyl compounds, such as (poly)ethylene glycol diglycidyl ether, (poly)ethylene glycol triglycidyl ether, (poly)glycerol diglycidyl ether, (poly)glycerol triglycidyl ether, (poly)propylene glycol polyglycidyl ether, and (poly)glycerol polyglycidyl ether are particularly preferable. These post-crosslinking agents may be used singly, or in a combination of two or more.

The water-absorbent resin of the present invention can optionally include a chelating agent, as necessary. When the water-absorbent resin contains a chelating agent, a gel viscosity retention S of 0.5 or more can be more easily achieved, and the water-absorbent resin in a water-absorbed state can have further enhanced heat resistance.

The chelating agent can be of any kind. For example, a wide range of known metal chelating agents can be used. From the viewpoint that the heat resistance of the water-absorbent resin after water absorption can be more easily increased, the chelating agent preferably has five or more ligands. The upper limit of the number of ligands possessed by the chelating agent can be, for example, 12, 11, or 10.

Specific examples of chelating agents include ethylenediaminetetraacetic acid, nitrilotriacetic acid, hydroxyethylene diamine triacetic acid, diethylenetriamine pentaacetic acid, dihydroxyethyl glycine, diethylenetriamine pentamethylene phosphonic acid, and salts thereof. When the chelating agent is in the form of a salt, the salt can be of any kind. Examples include alkali metal salts such as salts of sodium and potassium; alkaline earth metal salts such as salts of magnesium and calcium; organic amine salts; ammonium salts; and the like. All or part of the ligands of the chelating agent can form a salt. Such chelating agents can be used singly, or in a combination of two or more.

Among the chelating agents, diethylenetriamine pentaacetic acid and salts thereof, and diethylenetriamine pentamethylene phosphonic acid and salts thereof are preferably used.

When the water-absorbent resin contains a chelating agent, the amount of the chelating agent is not particularly limited. For example, from the viewpoint that a gel viscosity retention S of 0.5 or more can be easily achieved and the heat resistance of the water-absorbent resin in a water-absorbed state can be easily increased, the content of the chelate agent is preferably 0.6 to 2.0 parts by mass, and more preferably 0.8 to 1.5 parts by mass, per 100 parts by mass of the water-absorbent resin.

When the water-absorbent resin contains a chelating agent, the method for incorporating the chelating agent into the water-absorbent resin is not particularly limited. A specific method for incorporating the chelating agent in the water-absorbent resin is described in detail below in section "2. Method for Producing Water-Absorbent Resin."

When the water-adsorbent resin contains a chelating agent, where and how the chelating agent is present are not particularly limited. For example, the chelating agent may be present inside of the water-absorbent resin; the chelating agent may be present on the surface of the water-absorbent resin; the chelating agent may be present on the surface and inside of the water-absorbent resin; and the water-absorbent resin and the chelating agent may be present independently.

The water retention capacity of the water-absorbent resin in tams of physiological saline retention capacity may be 25 g/g or more, 30 g/g or more, or 35 g/g or more, and may be 60 g/g or less, 55 g/g or less, 50 g/g or less, or 45 g/g or less. When the water retention amount is within the above ranges, the water-blocking material containing the water-absorbent resin tends to absorb a larger amount of water, and the water-blocking material tends to swell faster and more greatly due to water absorption. The water retention capacity of the water-absorbent resin in tams of physiological saline retention capacity is measured by the method described below in the Examples.

The water-absorbent resin of the present invention has a median particle size of, for example, 10 to 800 μm, preferably 30 to 500 μm, more preferably 50 to 300 μm, and still more preferably 100 to 200 μm.

The shape of the water-absorbent resin of the present invention may be any of a variety of shapes, such as spheres, powder, granules, ellipses, flakes, rods, and chunks.

The water-absorbent resin of the present invention has a gel viscosity retention S of 0.5 or higher; and thus has excellent heat resistance, even after water absorption. Specifically, even when the water-absorbent resin in a water-absorbed state is exposed to high temperatures, decomposition is less likely to occur. Therefore, even if the water-absorbent resin is placed in a high-temperature zone, such as a desert, decomposition is less likely to occur, and water-blocking effects can be maintained over a long period of time.

The water-absorbent resin of the present invention is suitable for a wide variety of applications, such as industrial materials such as water-blocking agents, and agents for preventing dew condensation; agricultural and horticultural materials such as water-retaining agents and soil conditioners; and hygienic materials such as disposable diapers and sanitary napkins. In particular, the water-absorbent resin of the present invention, which can maintain its water-blocking effect for a long period of time even in high-temperature zones, is suitable for use in the water-blocking material described below.

2. Method for Producing Water-Absorbent Resin

The water-absorbent resin of the present invention can be produced, for example, by a production method that includes a step of polymerizing a water-soluble ethylenically unsaturated monomer (hereinafter referred to as the "polymerization step"), and a step of removing water from the polymer (hereinafter referred to as the "drying step"). Further, the method for producing the water-absorbent resin can include, in addition to the polymerization step and the drying step, one or more steps selected from the group consisting of a step of adding a chelating agent (hereinafter referred to as the "chelating agent addition step") and a step of treating the polymer with a post-crosslinking agent (hereinafter referred to as the "post-crosslinking step"), if necessary. An example of the production method including the polymerization step and the drying step is described in detail below.

Polymerization Step

The polymerization step is a step for polymerizing a water-soluble ethylenically unsaturated monomer to obtain a polymer. The polymerization method can be any method, and examples include reversed-phase suspension polymerization, aqueous solution polymerization, emulsion polymerization, and like methods. From the standpoint of simplicity of the production steps and ease of adjusting the gel viscosity retention S to a value of 0.5 or more, reversed-phase suspension polymerization is preferably used in the polymerization step.

The reversed-phase suspension polymerization refers to, for example, a method in which a poorly soluble monomer with respect to a dispersion medium is suspended in the dispersion medium in the presence of a dispersion stabilizer, and polymerized.

The dispersion medium for use in reversed-phase suspension polymerization can be, for example, a hydrocarbon dispersion medium. Examples of the hydrocarbon dispersion medium include aliphatic hydrocarbons, such as n-hexane, n-heptane, n-octane, and ligroin; alicyclic hydrocarbons, such as cyclopentane, methyl cyclopentane, cyclohexane, and methyl cyclohexane; and aromatic hydrocarbons, such as benzene, toluene, and xylene. Of these dispersion mediums, n-hexane, n-heptane, and cyclohexane are preferably used from the standpoint of ease in industrial availability, quality stability, and low price. These dispersion mediums may be used singly, or in a combination of two or more. Examples of usable dispersion mediums include Exxsol Heptane (produced by Exxon Mobil Corporation: heptane and isomeric hydrocarbons) and Nappar 6 (produced by Exxon Mobil Corporation: cyclohexane and isomeric hydrocarbons), which are known as combined solvents; and the like.

Examples of the water-soluble ethylenically unsaturated monomer usable in reversed-phase suspension polymerization are the same as those described above in section "1. Water-Absorbent Resin."

In the reversed-phase suspension polymerization, a thickening agent can be used as needed. Examples of the thickening agent include hydroxyethyl cellulose, hydroxypropyl cellulose, methyl cellulose, carboxymethyl cellulose, polyacrylic acid, (partially) neutralized polyacrylic acid, polyethylene glycol, polyacrylamide, polyethyleneimine, dextrin, sodium alginate, polyvinyl alcohol, polyvinyl pyrrolidone, polyethylene oxide, and the like.

The dispersion stabilizer for use in the reversed-phase suspension polymerization may be a surfactant. Examples include sucrose fatty acid esters, polyglycerol fatty acid esters, sorbitan fatty acid esters, polyoxyethylene sorbitan fatty acid esters, polyoxyethylene glycerol fatty acid esters, sorbitol fatty acid esters, polyoxyethylene sorbitol fatty acid esters, polyoxyethylene alkyl ethers, polyoxyethylene alkyl phenyl ethers, polyoxyethylene castor oil, polyoxyethylene hydrogenated castor oil, alkylallyl formaldehyde condensed polyoxyethylene ethers, polyoxyethylene polyoxypropylene block copolymers, polyoxyethylene polyoxypropyl alkyl ethers, polyethylene glycol fatty acid esters, alkyl glucoside, N-alkyl gluconamide, polyoxyethylene fatty acid amide, polyoxyethylene alkylamine, phosphoric esters of polyoxyethylene alkyl ethers, phosphoric esters of polyoxyethylene alkyl allyl ethers, and the like. Among these, sorbitol fatty acid esters, polyglycerol fatty acid esters, sucrose fatty acid esters, and the like are preferable from the standpoint of monomer dispersion stability. These surfactants may be used singly, or in a combination of two or more.

In order to keep the water-soluble ethylenically unsaturated monomer well dispersed in a hydrocarbon dispersion medium and achieve a dispersion effect that is commensurate with the amount of the surfactant used, the amount of surfactant used is preferably 0.1 to 30 parts by mass, and more preferably 0.3 to 20 parts by mass, per 100 parts by mass of the water-soluble ethylenically unsaturated monomer in the first stage.

The dispersion stabilizer for use may be a combination of a surfactant with a polymeric dispersant. Examples of usable polymeric dispersants include maleic anhydride-modified polyethylene, maleic anhydride-modified polypropylene, maleic anhydride-modified ethylene-propylene copolymers, maleic anhydride-modified EPDM (ethylene-propylene-diene terpolymer), maleic anhydride-modified polybutadiene, maleic anhydride-ethylene copolymers, maleic anhydride-propylene copolymers, maleic anhydride-ethylene-propylene copolymers, maleic anhydride-butadiene copolymers, polyethylene, polypropylene, ethylene-propylene copolymers, oxidized polyethylene, oxidized polypropylene, oxidized ethylene-propylene copolymers, ethylene-acrylic acid copolymers, ethyl cellulose, ethyl hydroxyethyl cellulose, and the like. Among these, maleic anhydride-modified polyethylene, maleic anhydride-modified polypropylene, maleic anhydride-modified ethylene-propylene copolymers, maleic anhydride-ethylene copolymers, maleic anhydride-propylene copolymers, maleic anhydride-ethylene-propylene copolymers, polyethylene, polypropylene, ethylene-propylene copolymers, oxidized polyethylene, oxidized polypropylene, oxidized ethylene-propylene copolymers, and the like are preferable from the standpoint of monomer dispersion stability. These polymeric dispersants may be used singly, or in a combination of two or more.

In order to keep the water-soluble ethylenically unsaturated monomer well dispersed in a hydrocarbon dispersion medium and achieve a dispersion effect that is commensurate with the amount of the polymeric dispersant used, the amount of the polymeric dispersant for use is preferably 0.1 to 30 parts by mass, and more preferably 0.3 to 20 parts by mass, per 100 parts by mass of the water-soluble ethylenically unsaturated monomer in the first stage.

In the polymerization step, for example, a wide range of known polymerization initiators can be used. Examples of radical polymerization initiators include persulfates, such as potassium persulfate, ammonium persulfate, and sodium persulfate; peroxides, such as methyl ethyl ketone peroxide, methyl isobutyl ketone peroxide, di-t-butylperoxide, t-butyl cumylperoxide, and hydrogen peroxide; azo compounds, such as 2,2'-azobis(2-methylpropionamidine)dihydrochloride, 2,2'-azobis[2-(N-phenylamidino)propane]dihydrochloride, 2,2'-azobis[2-(N-allylamidino)propane]dihydrochloride, and 4,4'-azobis(4-cyanovaleric acid); and the like.

The radical polymerization initiators can also be combined with one or more reducing agents, such as sodium sulfite, sodium hydrogen sulfite, ferrous sulfate, and L-ascorbic acid, to use them as redox polymerization initiators.

The lower limit of the amount of the radical polymerization initiator for use in the polymerization step is preferably 0.01 mmol, and more preferably 0.05 mmol, per mole of the water-soluble ethylenically unsaturated monomer for use. The upper limit of the amount of the radical polymerization initiator for use is preferably 20 mmol, and more preferably 10 mmol, per mole of the water-soluble ethylenically unsaturated monomer used. The use of the radical polymerization initiator in an amount within this numerical range makes it easier to produce the water-absorbent resin.

A chain transfer agent may optionally be used in the polymerization step, if necessary. Examples of the chain transfer agent include hypophosphites, thiols, thiolic acids, secondary alcohols, amines, and the like.

An internal-crosslinking agent may be used as necessary in the polymerization step. This allows the polymer obtained in the polymerization step to have a structure in which the inside of the polymer is crosslinked with an internal-crosslinking agent.

Examples of the internal-crosslinking agent include compounds having two or more polymerizable unsaturated groups. Specific examples of the internal-crosslinking agent include di or tri(meth)acrylic acid esters of polyols, such as (poly)ethylene glycol (in the present specification, for example, "polyethylene glycol" and "ethylene glycol" together are referred to as "(poly)ethylene glycol"; the same applies below), (poly) propylene glycol, trimethylolpropane, glycerol polyoxyethylene glycol, polyoxypropylene glycol, and (poly)glycerol; unsaturated polyesters obtained by reacting the polyols listed above with unsaturated acids, such as maleic acid and fumaric acid; bisacrylamides, such as N,N'-methylenebis(meth)acrylamide; di or tri(meth) acrylic acid esters obtained by reacting polyepoxide with (meth)acrylic acid; di(meth)acrylic acid carbamyl esters obtained by reacting polyisocyanate, such as tolylene diisocyanate and hexamethylene diisocyanate, with hydroxyethyl (meth)acrylate; allylated starch; allylated cellulose; diallyl phthalate; N,N',N"-triallyl isocyanurate; divinyl benzene; and the like.

Examples of the internal-crosslinking agent further include, in addition to the compounds having two or more polymerizable unsaturated groups, glycidyl group-containing compounds, such as (poly)ethylene glycol diglycidyl ether, (poly)propylene glycol diglycidyl ether, and (poly) glycerol diglycidyl ether; (poly)ethylene glycol, (poly)propylene glycol, (poly)glycerol, pentaerythritol, ethylene diamine, polyethyleneimine, glycidyl (meth)acrylate, and the like. These internal-crosslinking agents may be used in a combination of two or more. Among these, (poly)ethylene glycol diglycidyl ether, (poly)propylene glycol diglycidyl ether, (poly)glycerol diglycidyl ether, and N,N'-methylenebisacrylamide are preferable from the standpoint of excellent reactivity at low temperatures.

When an internal-crosslinking agent is used, the amount of the internal-crosslinking agent for use is not particularly limited. The lower limit of the amount of the internal-crosslinking agent for use is preferably 0.0001 mmol, more preferably 0.0005 mmol, even more preferably 0.001 mmol, and particularly preferably 0.01 mmol, per mole of the water-soluble ethylenically unsaturated monomer used. The upper limit of the amount of the internal-crosslinking agent for use is preferably 5 mmol, more preferably 0.5 mmol, and even more preferably 0.05 mmol, per mole of the water-soluble ethylenically unsaturated monomer used.

The temperature for the polymerization reaction in the polymerization step can be suitably determined in accordance with, for example, the type and amount of radical polymerization initiator used. The temperature for the polymerization reaction can be, for example, 20 to 110° C., and preferably 40 to 90° C. The reaction time can be set, for example, within the range of 0.1 hours or more to 4 hours or less.

In reversed-phase suspension polymerization, the polymerization step can be performed, for example, by adding an aqueous solution containing an optionally neutralized water-soluble ethylenically unsaturated monomer, a thickening agent, a radical polymerization initiator, and an internal-crosslinking agent to a dispersion medium in which a polymer dispersion stabilizer has been dispersed; and then adding a surfactant to form a suspension. The order of adding each starting material is not limited to this order.

In the polymerization step, the water-soluble ethylenically unsaturated monomer is polymerized to form a polymer. For example, reversed-phase suspension polymerization provides a slurry in which the polymer formed of the water-soluble ethylenically unsaturated monomer is dispersed. When an internal-crosslinking agent is used, the polymer obtained in the polymerization step has a structure crosslinked with the internal-crosslinking agent.

The reversed-phase suspension polymerization may be performed in one stage, or in multiple stages such as two or more stages.

When the reversed-phase suspension polymerization is performed in two or more stages, for example, the first stage of reversed-phase suspension polymerization is performed by the method described above; and then the water-soluble ethylenically unsaturated monomer is added to and mixed with the reaction mixture obtained in the first stage of the polymerization step to perform the second and the subsequent stages of reversed-phase suspension polymerization in the same manner as in the first stage. In the reversed-phase suspension polymerization at the second stage or each of the subsequent stages after the second stage, the radical polymerization initiator and the optionally added internal-crosslinking agent, in addition to the water-soluble ethylenically unsaturated monomer, can be added in a molar ratio of each component to the water-soluble ethylenically unsaturated monomer within the numerical ranges described above, based on the amount of the water-soluble ethylenically unsaturated monomer added at the second stage or each of the subsequent stages after the second stage of reversed-phase suspension polymerization; and then reversed-phase suspension polymerization can be performed under the same conditions as those of the method described above.

When the reversed-phase suspension polymerization is performed in multiple stages, it is preferable to set the total amount of the polymerization initiator and the total amount of the optionally used internal-crosslinking agent, per mole of the water-soluble ethylenically unsaturated monomer used in reversed-phase suspension polymerization, so as to fall within the numerical ranges described above, from the standpoint of ease of producing the desired water-absorbent resin.

Drying Step

The drying step is a step for removing water from the polymer obtained in the polymerization step or from the polymer crosslinked with an internal-crosslinking agent, by adding energy such as heat from outside to the polymer. For example, in the case of reversed-phase suspension polymerization, water, the hydrocarbon dispersion medium, and other components can be removed from the polymer by performing azeotropic distillation in the drying step, with the polymer (hydrogel) obtained in the polymerization step being dispersed in the hydrocarbon dispersion medium. The drying step may be performed under ordinary pressure or under reduced pressure, and may be performed in a gas stream such as nitrogen in order to increase drying efficiency. When the drying step is performed under ordinary pressure, the drying temperature is preferably 70 to 250° C., more preferably 80 to 180° C., still more preferably 80 to 140° C., and particularly preferably 90 to 130° C. Under reduced pressure, the drying temperature is preferably 40 to 160° C., and more preferably 50 to 120° C.

The water content of the polymer or the polymer crosslinked with the internal-crosslinking agent can be adjusted by performing the drying step. The drying step may be performed concurrently with the post-crosslinking step described below.

Post-Crosslinking Step

The post-crosslinking step is a step for treating the polymer obtained in the polymerization step (including a polymer crosslinked with an internal-crosslinking agent).

Examples of the type of the post-crosslinking agent are the same as the post-crosslinking agents listed above in section "1. Water-Absorbent Resin."

The method for treating the polymer with a post-crosslinking agent is, for example, as follows: a post-crosslinking agent and a solvent are mixed to prepare a treatment solution containing the post-crosslinking agent, and this treatment solution is brought into contact with the polymer to treat the polymer with the post-crosslinking agent.

The solvent for use to prepare the treatment solution containing a post-crosslinking agent can be any solvent. For example, hydrophilic organic solvents that dissolve the post-crosslinking agent well can be used. Examples of the solvent include, in addition to water, lower alcohols, such as methyl alcohol, ethyl alcohol, n-propyl alcohol, isopropyl alcohol, and propylene glycol; ketones, such as acetone and methyl ethyl ketone; ethers, such as diethyl ether, dioxane, and tetrahydrofuran; amides, such as N,N-dimethyl formamide; and sulfoxides, such as dimethyl sulfoxide; and the like. These hydrophilic organic solvents can be used singly or in a combination of two or more, or as a mixture solvent with water.

The treatment solution can be prepared, for example, by dissolving the post-crosslinking agent in a solvent. The mixing ratio of the post-crosslinking agent to the solvent can be any ratio. For example, the post-crosslinking agent is added in an amount of 0.1 to 10 parts by mass, per 100 parts by mass of the solvent.

The contact of the polymer with the treatment solution can be performed, for example, by mixing the polymer with the treatment solution by a suitable method. For example, the following method can be used: the treatment solution is added to the polymer in a container with the polymer being immobile or with the polymer being stirred in a hydrocarbon dispersion medium.

From the standpoint of ease of adjusting the gel viscosity retention S to 0.5 or more, the lower limit of the amount of the post-crosslinking agent for use is preferably 0.01 mmol, more preferably 0.05 mmol, and still more preferably 0.1 mmol, per mole of the water-soluble ethylenically unsaturated monomer that constitutes the polymer to be post-crosslinked. The upper limit of the amount of the post-crosslinking agent for use is preferably 10 mmol, more preferably 5 mmol, and still more preferably 2 mmol, per mole of the water-soluble ethylenically unsaturated monomer.

The reaction temperature (i.e., the temperature at which the polymer is treated with the post-crosslinking agent) in the post-crosslinking step is preferably 50 to 250° C., more preferably 60 to 180° C., and even more preferably 60 to 140° C. The reaction time of the post-crosslinking (i.e., the time for treating the polymer with the post-crosslinking agent at the reaction temperature) cannot be determined in general because it varies depending on the reaction temperature, the type and the amount of the post-crosslinking agent used, etc. However, the reaction temperature is usually 1 to 300 minutes, and preferably 5 to 200 minutes.

The post-crosslinking step is preferably performed simultaneously with or after the drying step.

Chelating Agent Addition Step

The chelating agent addition step is a step for adding a chelating agent to the water-absorbent resin. The same types of chelating agents as described above in section "1. Water-Absorbent Resin" can be mentioned as examples.

The chelating agent addition step can be carried out, for example, after the drying step described above; or the chelating agent addition step can be carried out during the polymerization step described above. If the chelating agent addition step is performed in the polymerization step, the chelating agent may be added to a container in which the polymerization reaction takes place before the polymerization reaction proceeds, added to a container in which the polymerization reaction takes place while the polymerization reaction is in progress, or added after the polymerization reaction is completed. When the chelating agent is added after the polymerization reaction is completed, the chelating agent can be present inside the water-absorbent resin. When the chelating agent is added during the polymerization reaction, the chelating agent can be present on the surface and inside the water-absorbent resin.

When the method for producing the water-absorbent resin includes the post-crosslinking step, the chelating agent addition step may be performed after the drying step, but before the post-crosslinking step; or performed after the post-crosslinking step.

When the chelating agent is added, the chelating agent can be added in the form of, for example, a solution of the chelating agent dissolved in a solvent, such as water, or the chelating agent can be added without using a solvent, for example, in a solid state. The polymer to which the chelating agent is added may be in the state of being dispersed in a dispersion medium, or may be in the form of a powder or the like by removing the dispersion medium. When the polymer is in the form of a powder, the so-called dry-blending method can be used in the chelating agent addition step.

In the chelating agent addition step, the amount of chelating agent for use is not particularly limited. For example, from the viewpoint that a gel viscosity retention S of 0.5 or more can be easily achieved and the water-absorbent resin in a water-absorbed state tends to have a higher heat resistance, the content of the chelate agent is preferably 0.6 to 2.0 parts by mass, and more preferably 0.8 to 1.5 parts by mass, per 100 parts by mass of the water-absorbent resin.

As described above, the water-absorbent resin of the present invention can be produced by a production method including a polymerization step and a drying step and, if necessary, further including a chelating agent addition step and/or a post-crosslinking step.

In the polymerization step or a step after the polymerization step, additives may be added according to the purpose in order to impart various properties to the water-ちらも include powders, surfactants, oxidants, reducing agents, radical chain inhibitors, antioxidants, antimicrobial agents, deodorants, and the like.

3. Water-Blocking Material

As long as the water-blocking material of the present invention includes a water-absorbent resin, the composition of the water-blocking material is not particularly limited. For example, the water-blocking material can have the same composition as a known water-blocking material. The water-blocking material can be formed of a water-absorbent resin alone. Alternatively, a mixture of water-absorbent resin and rubber and/or thermoplastic resin, etc., can be formed into a water-blocking material. The water-absorbent resin can also be retained in a non-woven fabric or paper to form a water-blocking material.

The water-blocking material of the present invention can be applied to various applications. For example, the water-blocking material can be used for various cables, for example, communication cables and power cables, such as optical cables and metal cables. In particular, the water-blocking material can be suitably used for wire cables used underground and undersea, and fiber optic cables used underground and undersea.

EXAMPLES

The following describes the present invention in more detail with reference to Examples. However, the present invention is not limited to the embodiments of these Examples.

Example 1

A round-bottom cylindrical separable flask with an inner diameter of 100 mm (hereinafter referred to as the round-bottom flask) equipped with a reflux condenser, a dropping funnel, a nitrogen gas inlet tube, a stirrer, and stirring blades (surface-coated with a fluorine resin) including two sets of four inclined paddle blades with a blade diameter of 50 mm was prepared. As a petroleum-based hydrocarbon dispersant, 700 ml of n-heptane was added to the round-bottom flask. As a surfactant, 1.10 g of sorbitan monolaurate (produced by NOF Corporation, product name: Nonionic LP-20R; HLB 8.6) was added. The temperature of the resulting mixture was raised to 45° C., thus preparing a solution of surfactant in n-heptane.

On the other hand, 92 g (1.03 mol) of a 80.5 mass % aqueous acrylic acid solution was added as an aqueous solution of a water-soluble ethylenically unsaturated monomer to a beaker with an inner volume of 300 mL. While the queous acrylic acid solution was cooled in ice water, 147.7 g of a 20.9 mass % aqueous sodium hydroxide solution was added dropwise to the beaker to neutralize 75 mol % of the acrylic acid. Then, 0.10 g (0.00037 mol) of potassium persulfate was added as a radical polymerization initiator and dissolved to prepare an aqueous solution.

Subsequently, the aqueous solution was all added to the solution of the surfactant in n-heptane in the round-bottom flask. While stirring with a stirrer at 700 rpm, the round-bottom flask was purged with nitrogen for 30 minutes. The round-bottom flask was then immersed in a water bath at 70° C. to raise the temperature of the reaction system, and a polymerization reaction was allowed to proceed for 1 hour to perform a polymerization step. A hydrogel polymer was obtained in the round-bottom flask by this polymerization step. Next, the round-bottom flask was immersed in an oil bath at 120° C., and 111.7 g of water was removed from the system while refluxing n-heptane by azeotropic distillation of water and n-heptane to perform a drying step.

After this drying step, 2.04 g (0.0018 mol) of a 45 mass % aqueous solution of a pentasodium salt of diethylenetriamine pentaacetic acid was added as a chelating agent having 5 ligands to a round-bottom flask to perform a chelating agent addition step.

After this chelating agent addition step, 4.14 g (0.00048 mol) of a 2 mass % aqueous solution of ethylene glycol diglycidyl ether was added to the round-bottom flask as a post-crosslinking agent. Subsequently, the round-bottom flask was heated to adjust the treatment temperature with the post-crosslinking agent to 80° C. The flask was maintained at this temperature for 2 hours to perform a post-crosslinking step. The round-bottom flask was then heated to 120° C., and the n-heptane in the round-bottom flask was evaporated at 120° C. to obtain 89.2 g of granular water-absorbent resin particles.

Example 2

The procedure was performed in the same manner as in Example 1, except that 2.04 g (0.0020 mol) of a 45 mass % aqueous trisodium diethylenetriaminepentaacetate solution was used as a chelating agent in place of the 45 mass % aqueous solution of a pentasodium salt of diethylenetriamine pentaacetic acid. 89.2 g of granular water-absorbent resin particles were thus obtained.

Example 3

In Example 1, after the drying step was performed, the post-crosslinking step was performed without performing the chelate agent addition step. After the post-crosslinking step, the round-bottom flask was heated to 120° C., and n-heptane in the round-bottom flask was evaporated at 120° C. to obtain a polymer having a structure crosslinked with the post-crosslinking agent. Subsequently, 1.0 parts by mass of diethylenetriamine pentaacetic acid was dry-blended as a chelating agent per 100 parts by mass of this polymer. A water-absorbent resin is thus obtained.

Example 4

The procedure was performed in the same manner as in Example 1, except that 2.97 g (0.0013 mol) of a 31 mass % aqueous solution of a heptasodium salt of diethylenetriaminepentamethylene phosphonic acid having 10 ligands was used as a chelating agent in place of the 45 mass % aqueous solution of a pentasodium salt of diethylenetriamine pentaacetic acid. 89.2 g of granulated water-absorbent resin particles were thus obtained.

Comparative Example 1

Granular water-absorbent resin particles were obtained in the same manner as in Example 3, except that 1.0 part by mass of a tetrasodium salt of ethylenediamine tetraacetic acid was used as a chelating agent in place of the diethylenetriamine pentaacetic acid.

Comparative Example 2

The procedure was performed in the same manner as in Example 3, except that 1.0 parts by mass of ethylenediaminetetraacetic acid was used as a chelating agent in place of the diethylenetriaminepentaacetic acid.

Method for Measuring Gel Viscosity Retention

The gel viscosity retention of the water-absorbent resins obtained in the Examples and Comparative Examples was measured by the following method. First, 1500 g of distilled water was added to a 2 L beaker, and stirred at 600 rpm using a magnetic stirrer bar (13 mm φ×43 mm without a ring). After 1.5 g of a water-absorbent resin was placed into the vortex created by this stirring, the mixture was stirred for 1 hour. The resulting mixture was then filtered through a 200-mesh wire mesh, and allowed to stand for 15 minutes. The gel viscosity of the thus-obtained swollen gel was immediately measured and used as the "initial gel viscosity"

(in the present invention, this is defined as the "initial gel viscosity"). 250 g of the swollen gel after this measurement was immediately placed into a 250-mL glass heat-resistant bottle with an outer diameter of 70 mm φ, allowed to stand in a hot-air dryer (produced by Advantec Co., Ltd., FV-320) at 90±2° C., and the viscosity of the swollen gel was measured every 24 hours (1 day). The gel viscosity value after the lapse of 10 days (in the present invention, this is defined as "gel viscosity after 10 days") was used to calculate the gel viscosity retention S according to the following formula (I).

$$\text{Gel viscosity retention } S = B/A \qquad (I)$$

(wherein A represents the initial gel viscosity (mPa·s), and B represents the gel viscosity after 10 days (mPa·s).)

The gel viscosity was determined by adjusting the temperature of the swollen gel to 25±0.5° C., and making measurement using a Vismetron (produced by Shibaura Systems, VS-H1 type, rotor No. 5, rotation speed: 20 rpm). In this gel viscosity measurement, the gel was placed to a height of 65 mm in a 200 mL glass beaker with an inner diameter of 64 mm φ.

Method for Measuring Water Retention Capacity

A cotton bag (Cottonbroad No. 60, 100 mm width×200 mm length) containing 2.0 g of a water-absorbent resin was placed in a 500-mL capacity beaker. 500 g of a 0.9 mass % aqueous sodium chloride solution (physiological saline) was poured into the cotton bag containing the water-absorbent resin all at once so as not to form lumps. The upper part of the cotton bag was tied with a rubber band, and the cotton bag was allowed to stand for 30 minutes to allow the water-absorbent resin to swell. The cotton bag after the lapse of 30 minutes was dehydrated for 1 minute using a dehydrator (produced by Kokusan Co., Ltd., product number: H-122) which had been set at a centrifugal force of 167 G, and the mass Wa (g) of the cotton bag containing the swollen gel after dehydration was measured. The operation was performed in the same manner as above except that the water-absorbent resin was not added. The mass Wb (g) of the empty cotton bag upon wetting was measured. The water retention capacity was calculated by the following formula.

$$\text{Water retention capacity } q/g = [Wa - Wb]/2.0$$

Method for Measuring Median Particle Size

The median particle diameter of the water-absorbent resin was measured in the following manner. More specifically, JIS standard sieves were sequentially assembled in order from the top down, by combining a sieve with a mesh size of 850 μm, a sieve with a mesh size of 500 μm, a sieve with a mesh size of 250 lam, a sieve with a mesh size of 180 lam, a sieve with a mesh size of 150 μm, a sieve with a mesh size of 106 μm, a sieve with a mesh size of 75 μm, and a receiving tray. 50 g of a water-absorbent resin was fed to the uppermost sieve of the combination, and shaken using a Ro-Tap type shaker (produced by Sieve Factory Iida Co., Ltd.) to conduct classification according to JIS Z 8815 (1994). After the classification, the mass of the water-absorbent resin particles remaining on each sieve was calculated as a mass percentage relative to the total amount to determine a particle size distribution. The calculated values of the mass of the water-absorbent resin particles remaining on the sieves were integrated in descending order of the particle diameters with respect to the particle size distribution, and the relationship between the mesh size of the sieve and the integrated value of the mass percentages of the water-absorbent resin particles remaining on the sieve was plotted on a logarithmic probability paper. The plotted points on the probability paper were connected by straight lines; thus, the particle diameter corresponding to 50 mass % of the integrated mass percentage was obtained as a median particle diameter.

| Example/ Comp. Ex. | Water retention capacity (g/g) | Median particle diameter (μm) | Initial gel viscosity (mPa · S) | Gel viscosity after the lapse of 10 days (mPa · S) | Gel viscosity retention S |
|---|---|---|---|---|---|
| Example 1 | 40 | 170 | 5900 | 7160 | 1.21 |
| Example 2 | 41 | 173 | 5260 | 6750 | 1.28 |
| Example 3 | 40 | 172 | 5340 | 6900 | 1.29 |
| Example 4 | 41 | 178 | 4990 | 2840 | 0.57 |
| Comp. Ex. 1 | 39 | 175 | 5150 | — | — |
| Comp. Ex. 2 | 40 | 171 | 5100 | — | — |

Table 1 shows the values of initial gel viscosity A, gel viscosity B after 10 days, and gel viscosity retention S of the water-absorbent resins obtained in the Examples and Comparative Examples.

Table 1 shows that the water-absorbent resins obtained in Examples 1 to 4 had a gel viscosity retention S of more than 0.5. The number of days required for the initial gel viscosity A to fall below half of its value was 17 days (2810 mPa·s) in the water-absorbent resin obtained in Example 1, 18 days (2510 mPa·s) in the water-absorbent resin obtained in Example 2, 17 days (2480 mPa·s) in the water-absorbent resin obtained in Example 3, and 11 days (2100 mPa·s) in the water-absorbent resin obtained in Example 4.

In contrast, the water-absorbent resins obtained in Comparative Examples 1 and 2 could not maintain their gel state after 10 days due to decomposition and degradation. The water-absorbent resin obtained in Comparative Example 1 had a gel viscosity after 4 days of 2020 mPa·s, and the water-absorbent resin obtained in Comparative Example 2 had a gel viscosity after 4 days of 2380 mPa·s. More specifically, the number of days required for the gel viscosity to fall below half of the initial gel viscosity A was 4 days in both the water-absorbent resins obtained in Comparative Example 1 and Comparative Example 2, and these water-absorbent resins had remarkably poor heat resistance.

These results indicate that the water-absorbent resins obtained in Examples 1 to 4 have excellent heat resistance, even in a water-absorbed state; and can maintain water-blocking effects over a long period of time, even in high-temperature environments.

The invention claimed is:

1. A water-absorbent resin comprising a crosslinked polymer of a water-soluble ethylenically unsaturated monomer and a chelating agent having five or more ligands,
   the water-absorbent resin having a median particle size of 100 to 200 μm,
   the water-absorbent resin having a gel viscosity retention S of 0.5 or more as calculated by the following formula (I):

$$\text{Gel viscosity retention at high temperature } S = B/A \qquad (I)$$

wherein A represents an initial gel viscosity (mPa·s); and
B represents a gel viscosity (mPa·s) after 10 days, and
the initial gel viscosity A of the water-absorbent resin being 4000 mPa's or more and being measured by the following method: 1500 g of distilled water is added to a beaker, and stirred at 600 rpm using a magnetic stirrer bar; 1.5 g of a water absorbent resin is placed into a vortex created by this stirring and the mixture is stirred for 1 hour; the resulting mixture is then filtered through a 200 mesh wire mesh, and allowed to stand for 15 minutes; the gel viscosity of the thus-obtained swollen gel is immediately measured and used as the initial gel viscosity.

2. The water-absorbent resin according to claim 1, wherein the polymer is crosslinked with a post-crosslinking agent.

3. A water-blocking material comprising the water-absorbent resin of claim 1.

* * * * *